United States Patent [19]

Nagel

[11] Patent Number: 5,373,121
[45] Date of Patent: Dec. 13, 1994

[54] METHOD AND APPARATUS FOR SAVING ELECTRICAL ENERGY IN AN HYDRAULIC ELEVATOR DRIVE

[75] Inventor: Heinz-Dieter Nagel, Berlin, Germany

[73] Assignee: Inventio AG, Hergiswil, Switzerland

[21] Appl. No.: 26,545

[22] Filed: Mar. 4, 1993

[30] Foreign Application Priority Data

Mar. 4, 1992 [CH] Switzerland .............. 00670/92

[51] Int. Cl.$^5$ .............................................. B66B 9/04
[52] U.S. Cl. ...................................... 187/275; 187/286
[58] Field of Search ............... 187/29.2, 110, 111, 187/116, 118, 117; 60/329, 393, 420

[56] References Cited

U.S. PATENT DOCUMENTS

| | | | |
|---|---|---|---|
| 3,762,165 | 10/1973 | Takenoshita et al. | 60/445 |
| 3,842,943 | 10/1974 | Nakamura et al. | 187/28 |
| 4,199,943 | 8/1980 | Hunt | 60/430 |
| 5,014,823 | 5/1991 | Pelto-Huikko . | |
| 5,048,644 | 9/1991 | Pelto-Huikko . | |
| 5,243,154 | 9/1993 | Tomisawa et al. | 187/111 |

FOREIGN PATENT DOCUMENTS

| | | |
|---|---|---|
| 4034666 | 10/1991 | Germany . |
| 246412 | 12/1985 | Japan . |
| 60-246412 | 12/1985 | Japan . |
| 8701922 | 3/1989 | Netherlands . |
| 465805 | 11/1968 | Switzerland . |

Primary Examiner—Steven L. Stephan
Assistant Examiner—Robert Nappi
Attorney, Agent, or Firm—Howard & Howard

[57] ABSTRACT

A drive system for an hydraulic elevator operated at a constant output power for any load during elevator car travel in the upward direction. The maximum nominal speed in the upward direction is selected for a load which typically occurs most frequently and the drive is designed accordingly. The car speed is reduced correspondingly for higher loads and increased correspondingly for lower loads. The variable car speed is achieved either through the use of an adjustable pump of variable displacement volume controlled by a pressure regulating valve or through the use of a positive displacement pump of constant displacement volume which is driven by a frequency regulated electrical motor.

11 Claims, 2 Drawing Sheets

METHOD AND APPARATUS FOR SAVING ELECTRICAL ENERGY IN AN HYDRAULIC ELEVATOR DRIVE

BACKGROUND OF THE INVENTION

The present invention relates generally to an hydraulic drive for elevators and, in particular, to a method and apparatus for reducing the electrical energy required to drive an hydraulic drive pump in an elevator system.

To ascertain the power output requirements for the drive of an hydraulic elevator, a maximum carrying capacity and a speed of travel in the upward direction are selected for the elevator car. For a total mass "P" consisting of car weight, carrying capacity and possible additional weights and a predetermined desired travel speed "v" in the upward direction, a maximum power requirement "N" is calculated by the formula:

$$N = P \cdot v$$

It is evident from this formula that the power requirement of an elevator drive is directly dependent on the mass to be moved and on the speed or elevator car.

However, the maximum power of the drive is utilized only when the elevator car is loaded to the full carrying capacity. For smaller loads, the drive operates with poorer efficiency and thus with relatively high energy consumption.

An hydraulic elevator having relatively low energy consumption is shown in the German patent document DE-OS 40 34 666. This elevator is driven by an inverter energy source and includes a main cylinder with a piston connected to an elevator car and an auxiliary or balancing cylinder with a fixed balancing weight and a selectable balancing weight. The cylinders are connected together by an hydraulic pump. The fixed balancing weight corresponds normally to the weight of the elevator car, while the selectable balancing weight corresponds to approximately one half the maximum load in the elevator car. Thereby, the pressure difference between the main cylinder and the balancing cylinder is kept as small as possible for all loads. The design of the size of the drive thus depends on the difference between the loading of the balancing cylinder and the main cylinder. The output power during downward travel without a load is calculated by the formula:

$$N = [(A+B+0)-(C+B+w/2)] \cdot v + (A-C-w/2) \cdot v$$

(when C=A):
$$N = -(w/2) \cdot v$$

The output power during downward travel at full load is calculated by the formula:

$$N = [(A+B+W)-(C+B+w/2)] \cdot v = (A-C+w/2) \cdot v$$

(when C=A):
$$N = +(w/2) \cdot v$$

In each formula above, "N" is the output or driving power, "A" is the mass of the car, "B" is the mass of the piston, "W" is the mass of the maximum car load, "w/2" is the mass of one half of the car load, "C" is the mass of the fixed balancing weight (here C=A) and "v" is the lifting speed.

A disadvantage of this hydraulic elevator is that an additional auxiliary cylinder with a fixed and a selectable balancing weight, the necessary connecting line and a relatively expensive inverter energy source are required.

SUMMARY OF THE INVENTION

The present invention concerns a method and an apparatus for operating an hydraulic elevator utilizing a constant output power drive to reduce the amount of electrical energy required by the drive. An electrical motor driven hydraulic pump draws fluid from a reservoir and pumps the fluid through a main line and a control valve into a cylinder of a piston-cylinder unit connected to an elevator car during upward travel of the car. During downward travel of the car, the fluid flows from the cylinder through the control valve back into the reservoir.

The invention is based on the task of providing a method and a device for the saving of electrical energy for the drive of an hydraulic elevator, which drive operates with practically constant energy requirements and with good efficiency during upward travel of the elevator car. The nominal travel speed for the car is selected for that load which, according to experience, occurs most frequently. For example, the typical load may be two persons such that a greater travel speed is achieved when the load is less and a lesser travel speed is achieved for a full load. During downward travel, the speed is regulated by a valve in dependence on the loading such that the travel speed is increased for greater loading. Thus, such a drive system can be smaller than a drive system which operates at a constant nominal travel speed for each load.

The method for reducing the power required to drive an hydraulic elevator system includes the steps of determining a load of an elevator car connected to a piston-cylinder unit during upward travel of the elevator car by sensing a fluid pressure value of fluid being supplied to a cylinder of the piston-cylinder unit, generating a control signal proportional to the sensed fluid pressure value, and controlling a pump supplying fluid to the cylinder in response to the control signal to maintain a constant output power from the piston-cylinder unit whereby as the load of the elevator car changes, a speed of travel of the elevator car is changed. The pump is controlled by regulating a displacement volume of the pump in an inverse relationship to the load of the elevator car.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
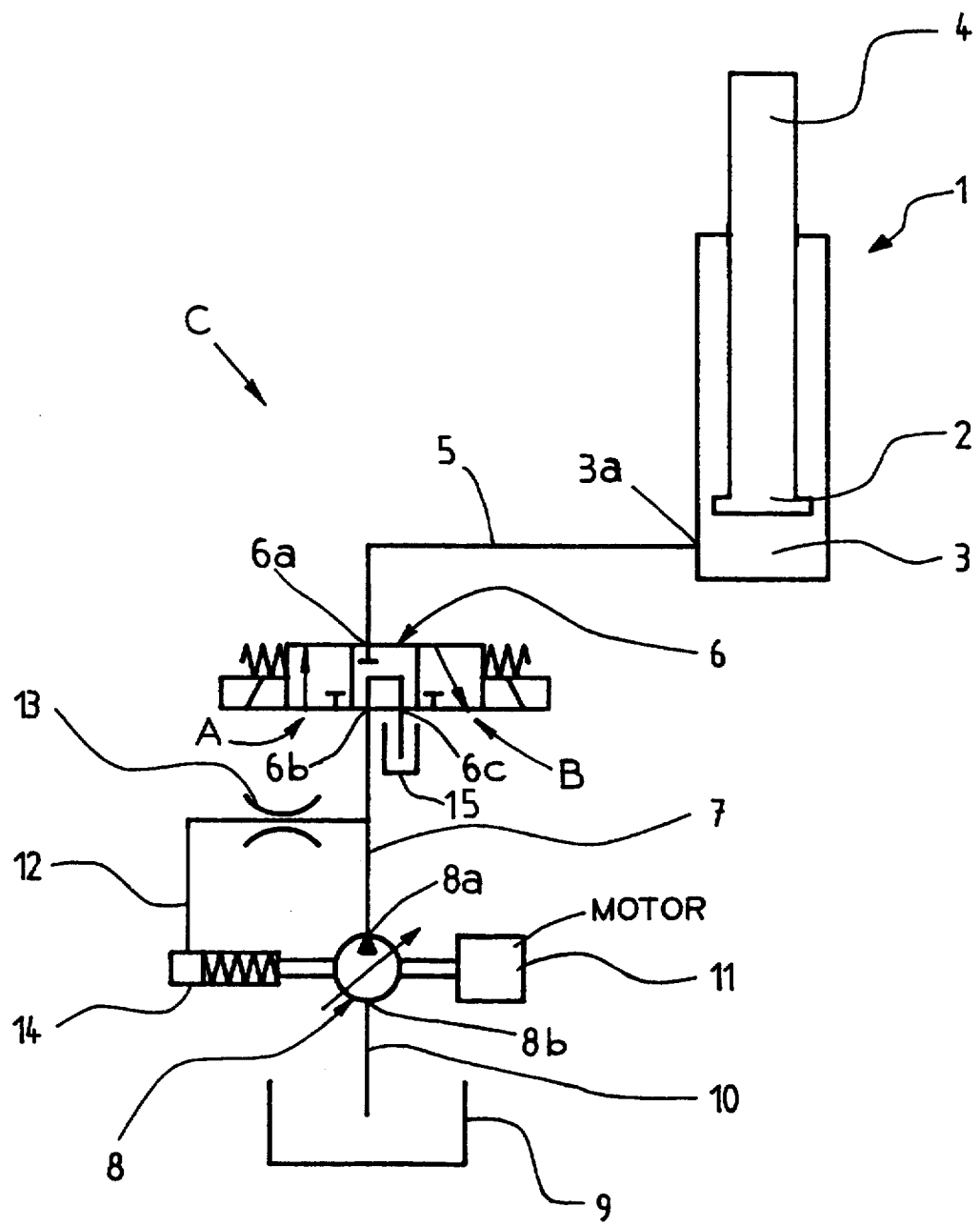
FIG. 1 is a schematic block diagram of an hydraulic drive system for an elevator utilizing a variable displacement pump.

In the FIG. 1, there is shown an hydraulic elevator drive system C having a piston-cylinder unit 1 which includes a piston 2 movable up and down in a generally vertically extending cylinder 3. A piston rod 4 is attached to an upper surface of the piston 2 and extends through an upper end of the cylinder 3 for moving an elevator car (not shown). The cylinder 3 has an opening 3a formed adjacent a lower end thereof which opening is connected by a supply line 5 with an outlet port 6a of a control or lowering valve 6. The port 6a is normally closed as shown. However, the control valve 6 can be actuated to a setting A for the upward operation of the piston 2 and to a setting B for the downward operation of the piston. An inlet port 6b of the control valve 6 is connected to an outlet port 8a of a variable displacement pump 8 by a main line 7. An inlet port 8b of the pump 8 is connected to an hydraulic fluid reservoir 9 by an inlet line 10. The pump 8 is driven by an electrical motor 11 mechanically coupled to the pump. The main line 7 is connected to one end of a sensing line 12 having an opposite end connected through a flow restrictor or throttle 13 to an inlet of a pressure regulating valve 14. The fluid pressure in the cylinder 3 is sensed by the control line 12 and a fluid control signal is applied to the valve 14 The valve 14 has an outlet connected to the pump 8 for regulating the displacement volume at the outlet port 8a in response to the control signal.

Figure 2:
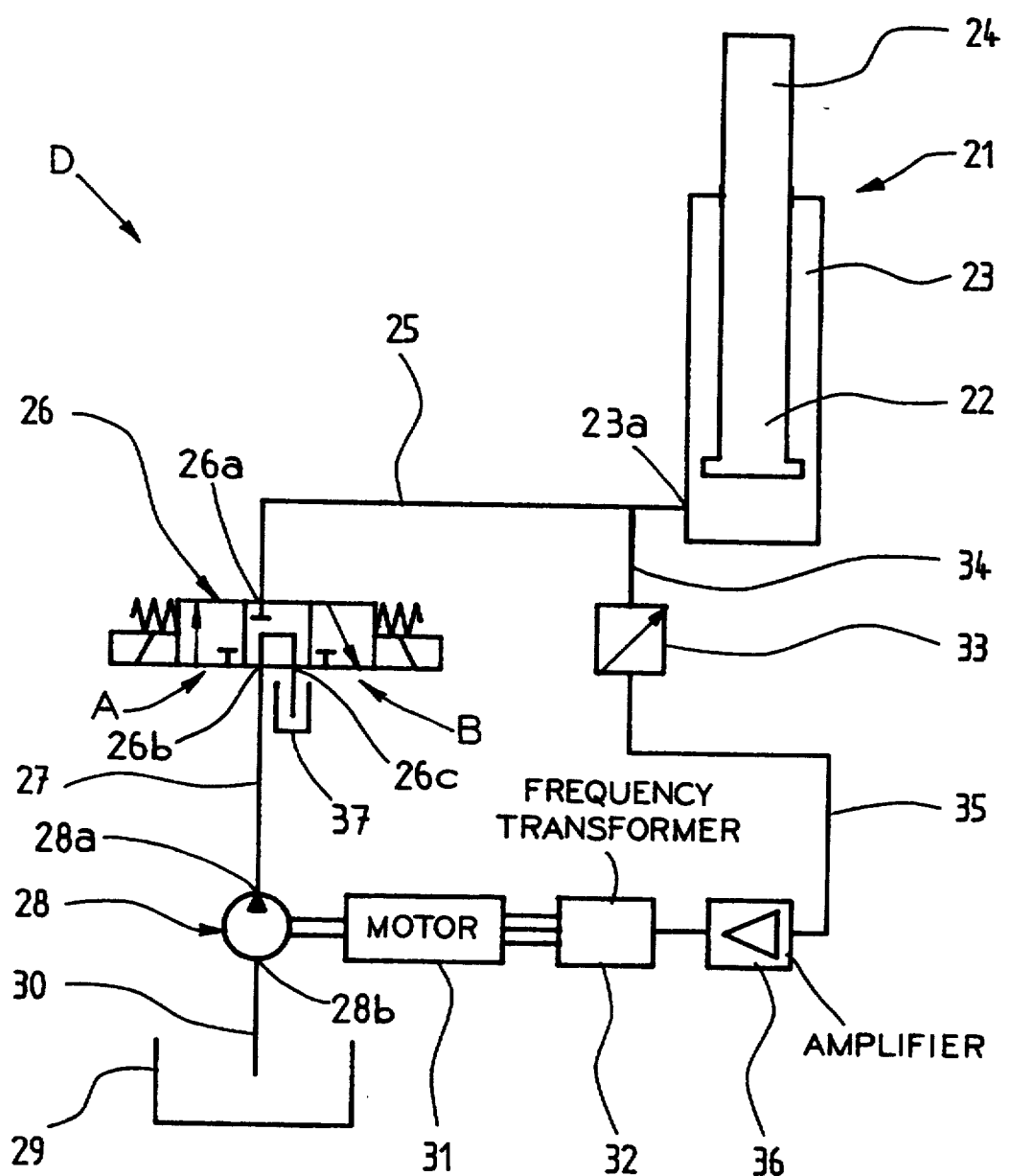
FIG. 2 is a schematic block diagram of an hydraulic drive system for an elevator utilizing a positive displacement pump.

In the FIG. 2, there is shown an alternate embodiment hydraulic elevator drive system D having a piston-cylinder unit 21 which includes a piston 22 movable up and down in a generally vertically extending cylinder 23. A piston rod 24 is attached to an upper surface of the piston 22 and extends through an upper end of the cylinder 23. The cylinder 23 has an opening 23a adjacent a lower end thereof connected to an outlet port 26a of a control valve 26 by a supply line 25. The outlet port 26a is normally closed as shown and the valve 26 can be actuated to a setting A for the upward movement of the piston 22 and to a setting B for the downward movement of the piston 22. An inlet port 26b of the control valve 26 is connected to an outlet port 28a of a positive displacement pump 28 by a main line 27. An inlet port 28b of the pump is connected to an hydraulic fluid reservoir 29 by an inlet line 30. The positive displacement pump 28 is driven by an electrical motor 31 mechanically coupled to the pump. The motor 31 is electrically connected to a frequency transformer 32 which regulates the speed of the motor steplessly in dependence on the loading of the pump 28. A pressure measurement transducer 33 is connected by a sensing line 34 to the supply line 25. The pressure measurement transducer 33 generates a control signal proportional to the fluid pressure sensed in the line 25 over an electrical line 35 connected between the transducer 33 and an amplifier 36. The amplifier 36 is electrically connected to the frequency transformer 32 which responds to the control signal generated by the amplifier 36 by controlling the speed of the motor 31.

In the drive system C illustrated in the FIG. 1, an elevator car (not shown) is moved upwardly by the piston rod 4 as hydraulic fluid is urged into the cylinder 3 of the piston-cylinder unit 1. The control valve 6 is switched to the setting A to provide a first flow path and hydraulic fluid is drawn from the reservoir 9 by the pump 8 and is forced under pressure through the control valve 6 by way of the line 5 into the opening 3a thereby moving the piston 2 and the piston rod 4 in an upward direction. The variable displacement pump 8 is controlled by the pressure regulating valve 14 in correspondence with the fluid pressure in the cylinder 3 so that, for constant driving power, the displacement volume of the pump 8 results in a speed of travel of the elevator car in the upward direction which corresponds to the load prevailing in the elevator car. As the load in the elevator car increases, the pressure in the cylinder 3 rises and the pump 8 is adjusted so that, for practically constant driving power, the displacement volume of the adjustable pump and, the speed of travel of the elevator car in the upward direction, both decrease.

In the drive system D illustrated in the FIG. 2, the elevator car (not shown) is moved upwardly by the piston rod 24 as hydraulic fluid is urged into the cylinder 23 of the piston-cylinder unit 21. The control valve 26 is switched to the setting A to provide a first flow path and hydraulic fluid is drawn from the reservoir 29 by the positive displacement pump 28 driven by the electrical motor 31. The electrical motor 31 is controlled by the frequency transformer 32 at a frequency dependent on the loading of the elevator car. The pressure measurement transducer 33 senses fluid pressure prevailing in the cylinder 23 in correspondence with the load present in the elevator car and converts this pressure measurement by way of the amplifier 36 and the frequency transformer 32 into a corresponding frequency. The rotational speed of the drive motor 31 for driving the positive displacement pump 28 depends upon the frequency of the electrical power supplied from the transformer 32 in that a lower frequency is generated for greater loading of the elevator car represented by high pressure in the cylinder 23, and the positive displacement pump 28 is driven at a lower rotational speed by the drive motor 31. The displacement volume of the positive-displacement pump 28 thereby is reduced for practically constant driving power and the speed of travel of the elevator car in the upward direction decreases.

In both of the drive systems C and D shown in the FIGS. 1 and 2 respectively, the speed of travel of the elevator car in the downward direction is regulated by the control valves 6 and 26 respectively, which valves are switched to the setting B to provide a second flow path such that the lowering speed of the elevator car is increased for higher loads. For example, as shown in the FIG. 1, the control valve 6 has an outlet port 6c which is connected to the port 6a in the B setting for fluid flow from the cylinder 3 to a reservoir 15 connected to the port 6c. Similarly, as shown in the FIG. 2, the control valve 26 has an outlet port 26c which is connected to the port 26a in the B setting for fluid flow from the cylinder 23 to a reservoir 37 connected to the port 26c. The reservoirs 15 and 37 can be the reservoirs 9 and 29 respectively.

It is also possible for each of the drive systems C and D, shown in the FIGS. 1 and 2 respectively, to provide stepped travel speeds. For example, a variable displacement pump with two or more different constant speeds can be used in place of the variable displacement pump 8 shown in the FIG. 1. Similarly, a positive displacement pump with a frequency regulated drive motor having two or more fixed rotational speed steps for different loads can be used in place of the pump 28 shown in the FIG. 2.

The nominal upward travel speed for the elevator car is selected for that load which, according to experience, occurs most frequently. For example, the typical load may be two persons such that a greater travel speed is achieved when the load is less and a lesser travel speed is achieved for a full load. During downward travel, the speed is regulated by a valve in dependence on the loading such that the travel speed is increased for greater loading. Thus, the drive system according to the present invention can be smaller than a drive system which operates at a constant nominal travel speed for each load.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A drive system for an hydraulic elevator having a load carrying elevator car connected to a piston rod of an hydraulic piston-cylinder unit, a first fluid flow path having an hydraulic pump driven for pumping fluid from a reservoir through a control valve into the cylinder to move the elevator car upwardly, and a second fluid flow path through which the fluid flows from the cylinder through the control valve back into the reservoir to move the elevator car downwardly comprising:

an hydraulic pump having an input connected to a fluid reservoir and an output connected by a line to a cylinder of a piston-cylinder unit connected to an elevator car, said hydraulic pump being a variable displacement pump of variable displacement volume;

means connected to said line for sensing a fluid pressure value of fluid in said line and generating a control signal and including a sensing line connected to said line for generating said control signal; and control means connected to said means for sensing and to said hydraulic pump, said control means being responsive to said control signal for regulating fluid supplied by said hydraulic pump to the cylinder by controlling a displacement volume of said hydraulic pump whereby a predetermined power output of the piston-cylinder unit is maintained constant during upward travel of the elevator car, said predetermined power output being based upon a typical load and a nominal upward travel speed for the elevator car.

2. The apparatus according to claim 1 including an electrical motor mechanically coupled to rotate said hydraulic pump and wherein said control means includes a pressure regulating valve connected between said sensing line and said hydraulic pump for controlling the displacement volume of said hydraulic pump.

3. The apparatus according to claim 2 including a fluid flow restrictor connected in said sensing line.

4. A drive system for an hydraulic elevator having a load carrying elevator car comprising:

an hydraulic piston-cylinder unit having a piston for connection to an elevator car and movable in a cylinder;

an hydraulic pump having an inlet port connected to a reservoir and an outlet port connected to a main line;

a control valve having a first port connected to said cylinder through a supply line, a second port connected to said main line and a third port connected to said reservoir, said control valve having a first setting for fluid flow from said second port to said first port to move the piston upwardly, and a second setting for fluid flow from said first port to said third port to move the piston downwardly;

means connected to one of said main line and said supply line for sensing a fluid pressure value of fluid flowing to said cylinder and generating a control signal; and control means connected to said means for sensing and to said hydraulic pump, said control means being responsive to said control signal for regulating fluid supplied by said hydraulic pump to said cylinder whereby a predetermined power output of said piston-cylinder unit is maintained constant during upward travel of an elevator car connected to said piston, said predetermined power output being based upon a typical load and a nominal upward travel speed for the elevator car.

5. The apparatus according to claim 4 wherein said hydraulic pump is a variable displacement pump of variable displacement volume, said means for sensing includes a sensing line connected to said main line for generating said control signal and said control means is responsive to said control signal for controlling a displacement volume of said hydraulic pump.

6. The apparatus according to claim 5 including an electrical motor mechanically coupled to rotate said hydraulic pump and wherein said control means includes a pressure regulating valve connected between said sensing line and said hydraulic pump for controlling the displacement volume of said hydraulic pump.

7. The apparatus according to claim 6 including a fluid flow restrictor connected in said sensing line.

8. The apparatus according to claim 4 wherein said hydraulic pump is a positive displacement pump of constant displacement volume, said means for sensing includes a pressure measurement transducer connected to said supply line for generating said control signal and said control means is responsive to said control signal for controlling a speed of rotation of said hydraulic pump.

9. The apparatus according to claim 8 including an electrical motor mechanically coupled to rotate said hydraulic pump and wherein said control means includes a frequency transformer connected to said electrical motor and an amplifier connected between said pressure measurement transducer and said frequency transformer for controlling the speed of rotation of said hydraulic pump.

10. A method for reducing the power required to drive an hydraulic elevator system, the elevator system including a load carrying elevator car connected to a piston rod of an hydraulic piston-cylinder unit, a first fluid flow path having an hydraulic pump for pumping fluid from a reservoir through a control valve into the cylinder to move the elevator car upwardly, and a second fluid flow path through which the fluid flows from the cylinder through the control valve back into the reservoir to move the elevator car downwardly, the method comprising the steps of:

a. selecting a first load value corresponding to a typical load for an elevator car connected to a piston-cylinder unit;

b. selecting a nominal upward travel speed value for the elevator car;

c. determining a value for a constant output power from the first load value and the nominal upward travel speed value;

d. determining a second load value corresponding to a load for the elevator car connected to the piston-cylinder unit during upward travel of the elevator car by sensing a fluid pressure value of fluid being supplied by a pump connected to a cylinder of the piston-cylinder unit;

e. generating a control signal proportional to said sensed fluid pressure value; and f. controlling the pump supplying the fluid to the cylinder in response to the control signal to maintain the constant output power from the piston-cylinder unit during upward travel of the elevator car.

11. The method according to claim 10 wherein the step f is performed by regulating a displacement volume of the pump in an inverse relationship to the second load value.

* * * * *